(12) United States Patent
Hwangbo

(10) Patent No.: US 11,945,493 B2
(45) Date of Patent: Apr. 2, 2024

(54) STEERING COLUMN FOR VEHICLE

(71) Applicant: HL MANDO CORPORATION, Pyeongtaek-si (KR)

(72) Inventor: Kyungseok Hwangbo, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/875,346

(22) Filed: Jul. 27, 2022

(65) Prior Publication Data

US 2023/0294750 A1 Sep. 21, 2023

(30) Foreign Application Priority Data

Mar. 16, 2022 (KR) .................. 10-2022-0032415

(51) Int. Cl.
*B62D 1/181* (2006.01)
*B62D 1/185* (2006.01)
*B62D 1/187* (2006.01)

(52) U.S. Cl.
CPC ............. *B62D 1/181* (2013.01); *B62D 1/185* (2013.01); *B62D 1/187* (2013.01)

(58) Field of Classification Search
CPC ......... B62D 1/181; B62D 1/185; B62D 1/187
See application file for complete search history.

(56) References Cited

FOREIGN PATENT DOCUMENTS

| DE | 102019203363 A1 | * | 9/2020 | ............. B62D 1/181 |
|---|---|---|---|---|
| DE | 102019215670 B3 | * | 11/2020 | |
| DE | 102021200445 A1 | * | 7/2022 | |
| WO | WO-2016186147 A1 | * | 11/2016 | ............. B62D 1/184 |
| WO | WO-2017068804 A1 | * | 4/2017 | ............. B62D 1/185 |
| WO | WO-2021099595 A1 | * | 5/2021 | ............. B62D 1/181 |

* cited by examiner

*Primary Examiner* — Drew J Brown
(74) *Attorney, Agent, or Firm* — Ladas & Parry, LLP

(57) ABSTRACT

Disclosed is a steering column for a vehicle. A steering column for a vehicle according to an embodiment of the present invention includes a housing provided in a vehicle and having an opening formed at one side thereof, a hollow shaft installed in the housing and configured to be movable in an axial direction through the opening of the housing, a roller having an outer peripheral surface configured to press an outer peripheral portion of the hollow shaft, an actuator configured to provide driving power for rotating the roller, and a first shaft configured to rotate relative to the hollow shaft and installed in the hollow shaft so as to be movable together with the hollow shaft, in which when the roller rotates, the hollow shaft and the first shaft are moved by a frictional force generated between the hollow shaft and the roller.

16 Claims, 15 Drawing Sheets

STEERING COLUMN FOR VEHICLE

CROSS REFERENCE TO RELATED APPLICATION

The present application claims priority to Korean Patent Application No. 10-2022-0032415, filed on Mar. 16, 2022, the entire contents of which is incorporated herein for all purposes by this reference.

BACKGROUND OF THE INVENTION

Field of the Invention

The present invention relates to a steering column for a vehicle, and more particularly, to a steering column for a vehicle that has no limitation in a telescopic operating distance and may improve the spatial utilization of a driver seat.

DESCRIPTION OF THE RELATED ART

In general, a steering column for a vehicle has a function of adjusting a degree to which a steering wheel protrudes and an angle at which the steering wheel is inclined in accordance with a driver's height or body type. The steering column for a vehicle provides a telescopic function and a tilting function to enable the driver to smoothly perform a steering operation.

The steering column for a vehicle in the related art includes a steering shaft having one end inserted into a hollow shaft and the other end coupled to a steering wheel, a housing configured to accommodate the hollow shaft and the steering shaft, and a base frame configured to couple the housing to a vehicle body.

In particular, the steering column for a vehicle in the related art includes a screw shaft extending in a direction parallel to an axial direction of the hollow shaft, coupling components configured to connect the screw shaft and the hollow shaft, and a motor configured to rotate the screw shaft. When the screw shaft rotates, the screw shaft, the steering shaft, and the steering wheel move together in the axial direction, thereby performing the telescopic function.

However, the steering column for a vehicle in the related art has a problem in that a length of the screw shaft provided at a lateral side of the hollow shaft restricts a telescopic operating distance, and a large number of accessory components are required to manufacture the steering column.

Further, the steering column for a vehicle in the related art has a problem in that the length of the screw shaft needs to increase to increase the telescopic operating distance. For this reason, there is a problem in that costs required to manufacture the steering column are increased, and a structural defect such as bending and warping of the screw shaft easily occur.

In addition, recently, as research and development have been conducted on autonomous vehicles, there is a need for a solution for enlarging a driver seat space that can be used by the driver in order to improve convenience and stability for the driver in an autonomous driving situation.

However, in the case of the steering column for a vehicle in the related art, a space for accommodating the screw shaft needs to be additionally provided at the lateral side of the steering shaft, and thus there is a limitation in the telescopic operating distance. For this reason, there is a problem in that a space that can be used by the driver in the driver seat is restricted.

Therefore, there is an acute need to develop a steering column for a vehicle that has no limitation in the telescopic operating distance and may reduce the manufacturing costs and improve the spatial utilization of the driver seat.

SUMMARY OF THE INVENTION

The present invention is proposed to solve these problems and aims to provide a steering column for a vehicle that has a telescopic function of adjusting a degree to which a steering wheel protrudes.

The present invention also aims to provide a steering column for a vehicle that has no limitation in a telescopic operating distance.

The present invention also aims to provide a steering column for a vehicle that may reduce manufacturing costs and the occurrence of a structural defect.

The present invention also aims to provide a steering column for a vehicle that may improve spatial utilization of a driver seat.

Technical problems to be solved by the present invention are not limited to the above-mentioned technical problems, and other technical problems, which are not mentioned above, may be clearly understood from the following descriptions by those skilled in the art to which the present invention pertains.

One aspect of the present invention provides a steering column for a vehicle, the steering column including: a housing provided in a vehicle and having an opening formed at one side thereof; a hollow shaft installed in the housing and configured to be movable in an axial direction through the opening of the housing; a roller having an outer peripheral surface configured to press an outer peripheral portion of the hollow shaft; an actuator configured to provide driving power for rotating the roller; and a first shaft configured to rotate relative to the hollow shaft and installed in the hollow shaft so as to be movable together with the hollow shaft, in which when the roller rotates, the hollow shaft and the first shaft are moved by a frictional force generated between the hollow shaft and the roller.

In this case, the steering column may further include a support member configured to press an outer peripheral surface of the hollow shaft to support the hollow shaft.

In this case, the support member may be disposed opposite to the roller based on the hollow shaft.

In this case, the support member may be provided in plural.

In this case, the plurality of support members may include first and second support members arranged in the axial direction.

In this case, the first and second support members may be respectively disposed at front and rear sides based on the roller when viewed in the axial direction.

In this case, the support member may include: a slip bushing configured to support the hollow shaft; and an elastic member configured to provide an elastic force that allows the slip bushing to support the hollow shaft.

In this case, a through-hole may be formed in the axial direction in the housing, at least a part of the hollow shaft may be accommodated in the housing, and the roller may press the hollow shaft through the through-hole.

In this case, a rotation shaft of the roller and the first shaft may be disposed to be perpendicular to each other.

A friction member may be provided on the outer peripheral surface of the roller.

A groove may be formed in the outer peripheral surface of the roller and correspond to an outer peripheral surface of the hollow shaft.

In this case, the steering column may further include a transmission configured to connect the actuator and the roller.

In this case, a bearing may be provided between the first shaft and the hollow shaft.

In this case, the steering column may further include a second shaft coupled to one end of the first shaft by a spline structure.

Another aspect of the present invention provides a steering column for a vehicle, the steering column including: a housing provided in a vehicle and having an opening formed at one side thereof; a hollow shaft installed in the housing, configured to be movable in an axial direction through the opening of the housing, and having a first gear formed in the axial direction on an outer peripheral surface thereof; a second gear coupled to the first gear; an actuator configured to provide driving power for rotating the second gear; and a first shaft configured to rotate relative to the hollow shaft and installed in the hollow shaft so as to be movable together with the hollow shaft, in which when the second gear rotates, the hollow shaft and the first shaft are moved by the first gear coupled to the second gear.

Still another aspect of the present invention provides a steering column for a vehicle, the steering column including: a housing provided in a vehicle and having an opening formed at one side thereof; a hollow shaft installed in the housing, configured to be movable in an axial direction through the opening of the housing, and having a pressing part formed in the axial direction at one side thereof; a roller having an outer peripheral surface configured to press the pressing part of the hollow shaft; an actuator configured to provide driving power for rotating the roller; and a first shaft configured to rotate relative to the hollow shaft and installed in the hollow shaft so as to be movable together with the hollow shaft, in which when the roller rotates, the hollow shaft and the first shaft are moved by a frictional force generated between the roller and the pressing part of the hollow shaft.

With the above-mentioned configuration, according to the steering column for a vehicle according to the embodiment of the present invention, the first shaft having one end to which the steering wheel may be coupled is movable in the axial direction together with the hollow shaft, such that the telescopic function of adjusting a degree to which the steering wheel protrudes may be performed.

In addition, according to the steering column for a vehicle according to the embodiment of the present invention, the hollow shaft and the first shaft are moved by the frictional force that is generated between the hollow shaft and the roller as the roller for pressing the outer peripheral portion of the hollow shaft rotates. Therefore, there is no limitation in the telescopic operating distance.

In addition, according to the steering column for a vehicle according to the embodiment of the present invention, the telescopic function may be performed by using the roller without including the screw shaft and the components for coupling the screw shaft and the hollow shaft. Therefore, it is possible to reduce the number of required components and the manufacturing costs and minimize the occurrence of a structural defect.

In addition, according to the steering column for a vehicle according to the embodiment of the present invention, the telescopic means may be simply and compactly implemented by using the roller and the actuator. Therefore, it is possible to minimize the space required to perform the telescopic function.

Further, a separate space for accommodating a shaft is not required, which makes it possible to improve the spatial utilization of the driver seat.

The effects of the present invention are not limited to the above-mentioned effects, and it should be understood that the effects of the present invention include all effects that may be derived from the detailed description of the present invention or the appended claims.

BRIEF DESCRIPTION OF THE DRAWINGS

FIGS. 6 and 7 are views for explaining an operating process of the steering column for a vehicle illustrated in FIG. 1, in which FIG. 6 is a view illustrating a state in which a steering shaft protrudes to the outside of a housing as a roller rotates, and FIG. 7 is a view illustrating a state in which the steering shaft is inserted into the housing as the roller rotates.

DETAILED DESCRIPTION OF THE INVENTION

Figure 1:
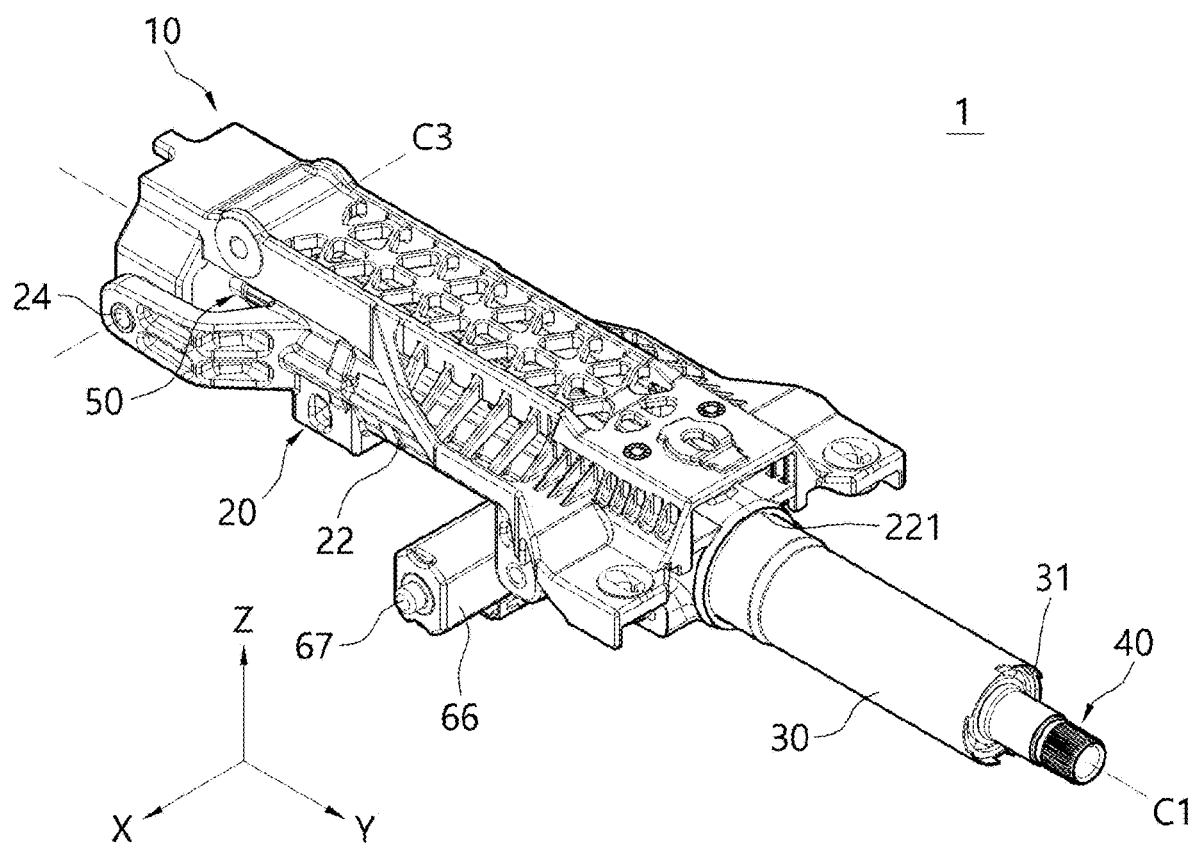
FIGS. 1 and 2 are perspective views illustrating a steering column for a vehicle according to a first embodiment of the present invention when viewed at different angles.

Hereinafter, an exemplary embodiment of the present invention will be described in detail with reference to the accompanying drawings so that those skilled in the technical field to which the present invention pertains may easily carry out the exemplary embodiment. The present invention may be implemented in various different ways, and is not limited to the embodiments described herein. In the drawings, a part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Unless otherwise specified, a case in which one constituent element is disposed at "a front side," "a rear side," "an upper side," or "a lower side" of another constituent element includes not only a case in which one constituent element is disposed at "the front side," "the rear side," "the upper side," or "the lower side" of another constituent element while directly adjoining another constituent element, but also a case in which a further constituent element is disposed between one constituent element and another constituent element. In addition, unless otherwise specified, a case in which one constituent element is "connected to" another constituent element includes not only a case in which one constituent element and another constituent element are directly connected to each other, but also a case in which one constituent element and another constituent element are indirectly connected to each other.

A steering column for a vehicle according to an embodiment of the present invention is a steering column for a vehicle in which a first shaft is movable in an axial direction together with a hollow shaft, and the first shaft and the hollow shaft are moved by a frictional force that is generated between the hollow shaft and a roller as the roller rotates while pressing an outer peripheral portion of the hollow shaft, such that a telescopic function may be performed without limitation in an operating distance.

In addition, the steering column for a vehicle according to the embodiment of the present invention is a steering column for a vehicle in which a telescopic means is simply and compactly implemented by using the roller and an actuator, which makes it possible to reduce the manufacturing costs and improve the spatial utilization of a driver seat.

In the following description with reference to the drawings, the directions are defined and described on the basis of coordinate axes illustrated in FIG. 1. More specifically, a positive z-axis direction is defined as an upward direction, and a negative z-axis direction is defined as a downward direction. A positive y-axis direction is defined and described as a forward direction, and a negative y-axis direction is defined and described as a rearward direction. A positive x-axis direction is defined as a leftward direction, and a negative x-axis direction is defined as a rightward direction.

Figure 2:
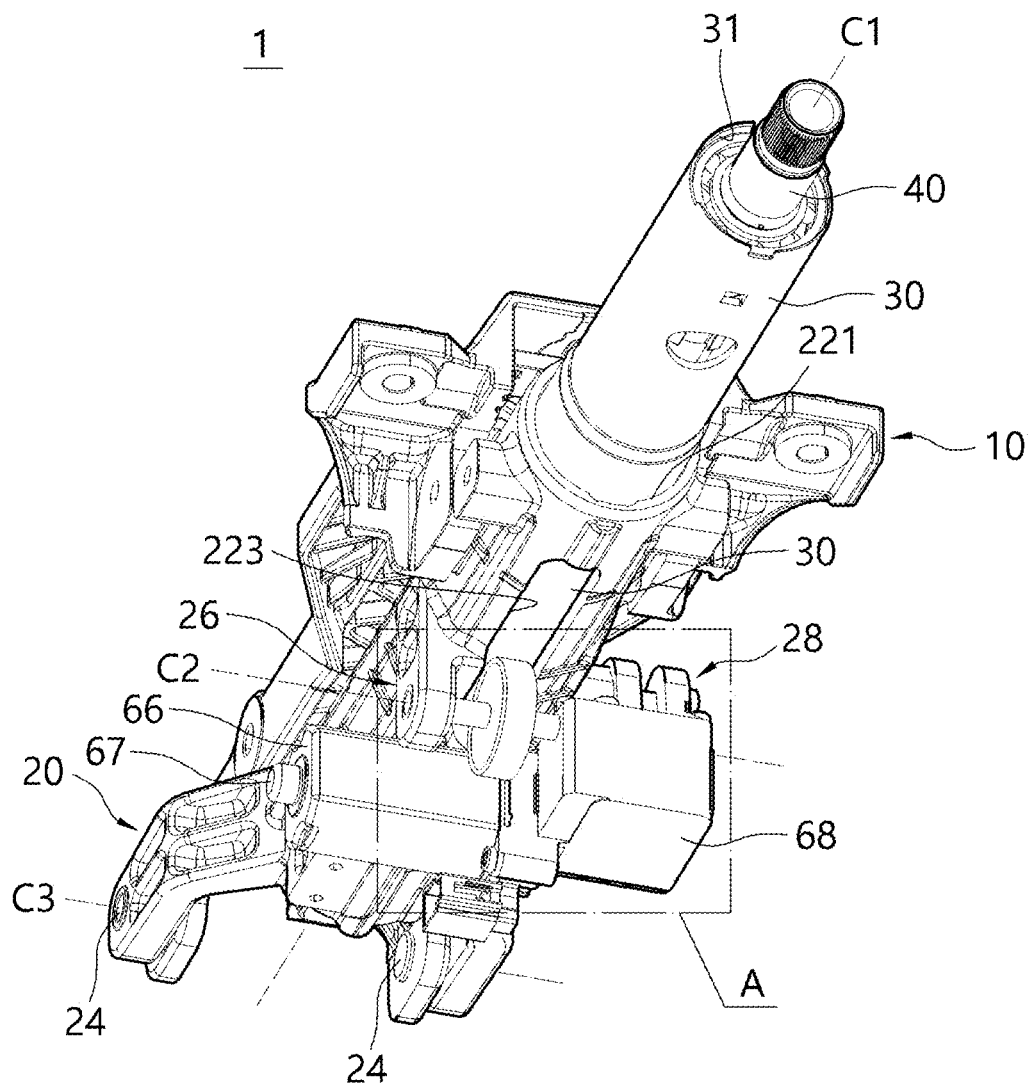
Figure 3:
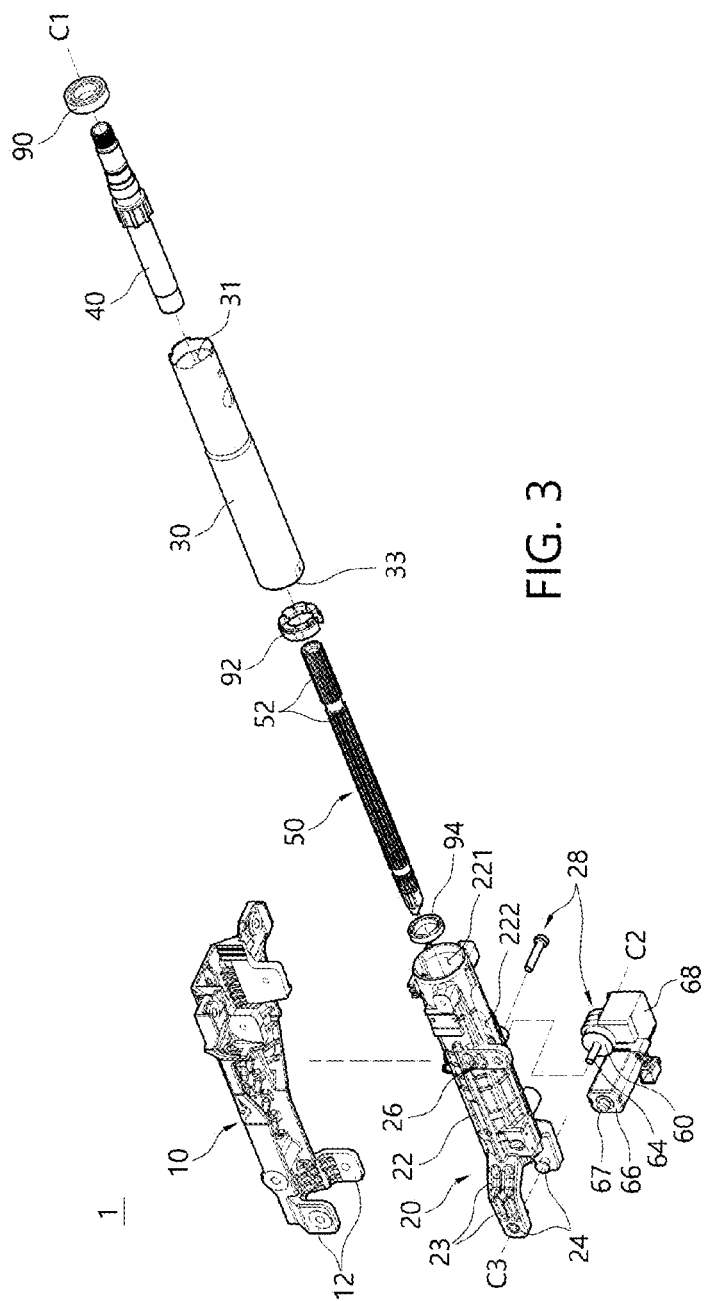
FIG. 3 is an exploded perspective view of the steering column for a vehicle illustrated in FIG. 1.
Figure 4:
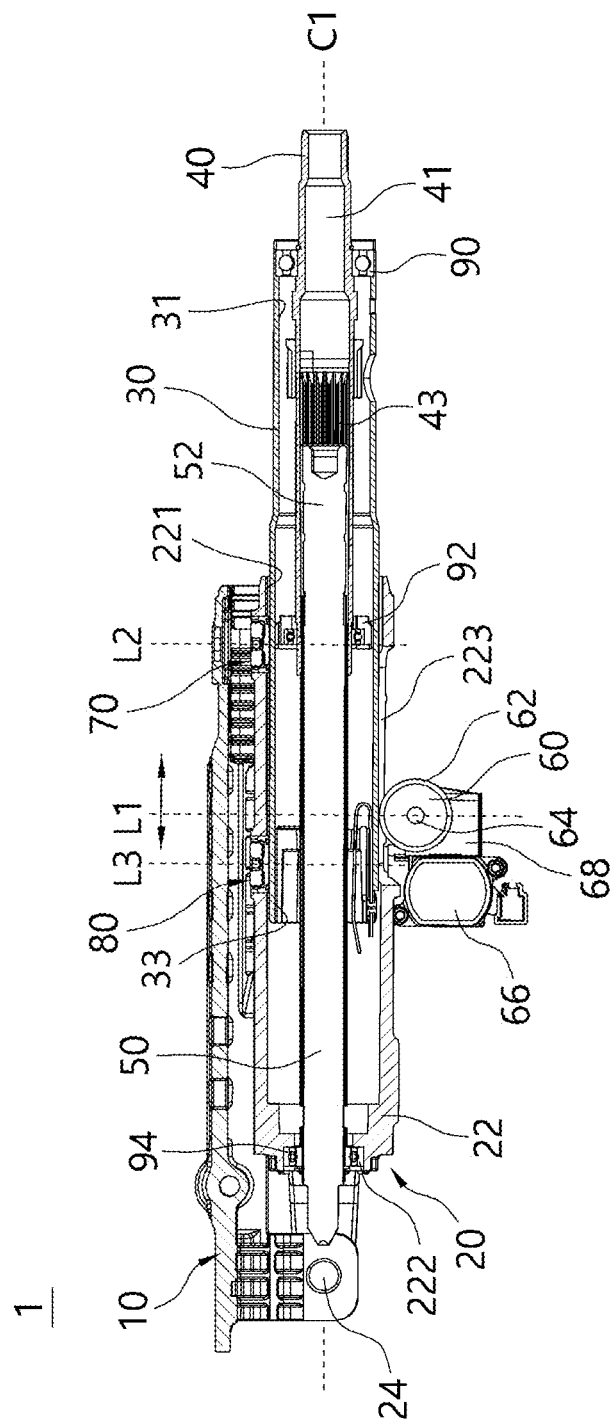
FIG. 4 is a cross-sectional view of the steering column for a vehicle illustrated in FIG. 1.

FIGS. 1 and 2 are perspective views illustrating a steering column for a vehicle according to a first embodiment of the present invention when viewed at different angles. FIG. 3 is an exploded perspective view of the steering column for a vehicle illustrated in FIG. 1. FIG. 4 is a cross-sectional view of the steering column for a vehicle illustrated in FIG. 1. FIG. is an enlarged view of part 'A' in FIG. 2.

Referring to FIGS. 1 to 4, a steering column 1 for a vehicle according to a first embodiment of the present invention may include a base frame 10, a housing 20, a hollow shaft 30, a first shaft 40, a second shaft 50, a roller 60, and an actuator 66.

Referring to FIG. 1, one side of the base frame 10 is installed on a frame (not illustrated) of a vehicle. A plurality of holes may be formed in the base frame 10, and bolts may be coupled to the plurality of holes so that the base frame 10 may be coupled to the vehicle frame.

Referring to FIGS. 2 to 4, the housing 20 is coupled to the other side of the base frame 10. The base frame 10 provides a space in which the housing 20 and the actuator 66 are provided in the vehicle.

The housing 20 includes a housing main body 22, a roller coupling part 26, and a transmission coupling part 28. In the present embodiment, the housing main body 22 has a cylindrical shape having an accommodation space therein.

In this case, the housing main body 22 extends in one direction, i.e., a direction of a first axis C1 parallel to a forward/rearward direction based on FIG. 2. First and second openings 221 and 222 are famed in the direction of the first axis C1 and respectively provided in front and rear portions of the housing main body 22.

Referring to FIG. 4, the accommodation space in the housing main body 22 communicates with the outside through the first and second openings 221 and 222. The housing 20 accommodates the hollow shaft 30, the first shaft 40, and the second shaft 50 therein and protects the hollow shaft 30, the first shaft 40, and the second shaft 50. In addition, the housing 20 provides a base on which the roller 60 and the actuator 66 are installed.

The hollow shaft 30 has an outer diameter equal to or somewhat smaller than an inner diameter of the housing main body 22. The hollow shaft 30 has a predetermined length in the direction of the first axis C1. Therefore, one end of the hollow shaft 30 may be installed and inserted into the housing main body 22 through the first opening 221.

In this case, the hollow shaft 30 is installed to be movable in the direction of the first axis C1 through the first opening 221 of the housing main body 22. In addition, the other end of the hollow shaft 30 protrudes to the outside of the housing main body 22.

That is, at least a part of the hollow shaft 30 may be accommodated in an internal space of the housing main body 22. Third and fourth openings 31 and 33 are respectively provided at two opposite ends of the hollow shaft 30. The interior of the hollow shaft 30 may communicate with the outside through the third and fourth openings 31 and 33.

The first shaft 40 is provided in the form of a tubular member disposed in the direction of the first axis C1 and having a hollow portion. In this case, a steering wheel (not illustrated), which may be operated by a driver, may be coupled to one end of the first shaft 40, i.e., a front end of the first shaft 40 based on FIG. 3. When the driver operates the steering wheel, the first shaft 40 may rotate together with the steering wheel.

An outer diameter of the first shaft 40 is equal to or smaller than an inner diameter of the hollow shaft 30. Therefore, the first shaft 40 may be installed in the hollow shaft 30. In this case, one end of the first shaft 40 protrudes to the outside of the hollow shaft 30.

In this case, a plurality of bearings 90 and 92 is installed between an inner peripheral portion of the hollow shaft 30 and an outer peripheral portion of the first shaft 40. In this case, the plurality of bearings 90 and 92 include a first bearing 90 and a second bearing 92.

In the present embodiment, the first bearing 90 is installed in the third opening 31, the second bearing 92 is installed at a position adjacent to the other end of the first shaft 40. In this case, the first and second bearings 90 and 92 may each be a ball bearing.

Therefore, the first shaft 40 may be installed in the hollow shaft 30 so as to be movable in the direction of the first axis C1 together with the hollow shaft 30 while being rotatable about the first axis C1 relative to the hollow shaft 30.

Referring back to FIGS. 3 and 4, the second shaft 50 is coupled to the other end of the first shaft 40. In this case, the second shaft 50 is disposed in the direction of the first axis C1 and disposed coaxially with the first shaft 40.

An inner diameter of the first shaft 40 is equal to or larger than a diameter of the second shaft 50. Therefore, one end of the second shaft 50 may be inserted into the first shaft 40. In the present embodiment, the first shaft 40 and the second shaft 50 are coupled to each other by means of a spline structure so that the second shaft 50 may be retracted into the first shaft 40 or extended to the outside of the first shaft 40.

More specifically, a plurality of guide grooves 43 is provided at the other side of an inner peripheral surface 41 of the first shaft 40 and formed in a longitudinal direction of the first shaft 40. A plurality of guide protrusions 52 corresponding to the guide grooves 43 is provided on an outer peripheral surface of the second shaft 50 and formed in a longitudinal direction of the second shaft 50.

As the second shaft 50 is inserted into the first shaft 40 in the direction of the first axis C1, the guide protrusions 52 and the guide grooves 43 may be coupled while engaging with one another. Therefore, the first shaft 40 and the second shaft 50 may rotate together about the first axis C1 and move relative to each other in the direction of the first axis C1.

The driver may transmit a steering force to the first shaft 40 by operating the steering wheel and rotating the first shaft 40 about the first axis C1. The first shaft 40 may transmit the steering force, which is received through the steering wheel, to the second shaft 50. The second shaft 50 may be rotated about the first axis C1 by the received steering force.

Therefore, the first shaft 40 may transmit the steering force (steering torque) to the second shaft 50. Further, the first shaft 40 and the second shaft 50 may move relative to each other in the direction of the first axis C1, such that a relative distance between the first and second shafts 40 and 50 may be adjusted. The steering column 1 for a vehicle according to the present embodiment may perform a telescopic function to be described below by using the above-mentioned operation.

Referring back to FIGS. 3 and 4, one end of the second shaft 50 is inserted into the hollow shaft 30 through the fourth opening 33 of the hollow shaft 30 and then coupled to the other end of the first shaft 40 by means of a spline structure. In this case, the other end of the second shaft 50 protrudes to the outside of the hollow shaft 30.

Referring to FIG. 4, the hollow shaft 30 and the first and second shafts 40 and 50 are accommodated in the housing main body 22. The hollow shaft 30 and the first shaft 40 are installed in the housing 20 and configured to be movable through the first opening 221. In this case, one end of the hollow shaft 30 and one end of the first shaft 40 protrude to the outside of the housing main body 22 through the first opening 221.

The other end of the second shaft 50, i.e., a rear end of the second shaft 50 based on FIG. 4 protrudes to the outside through the second opening 222 of the housing main body 22. In the present embodiment, a third bearing 94 may be installed in the second opening 222. In this case, the third bearing 93 may be a ball bearing.

Therefore, the second shaft 50 may rotate about the first axis C1 relative to the housing 20. The second shaft 50 may be fixed so as not to relatively move in the direction of the first axis C1.

With the above-mentioned coupling relationship, the first and second shafts 40 and 50 may rotate together about the first axis C1 and rotate relative to the housing 20 and the hollow shaft 30. The first shaft 40 and the hollow shaft 30 may move in the direction of the first axis C1 relative to the housing 20 and the second shaft 50. However, the position of the second shaft 50 relative to the housing 20 is fixed in the direction of the first axis C1.

Therefore, the steering column 1 for a vehicle according to the first embodiment of the present invention may perform a telescopic function of adjusting a degree to which the steering wheel protrudes because the first shaft 40 and the hollow shaft 30 may relatively move in the direction of the first axis C1 from the second shaft 50 and the housing 20.

Figure 5:
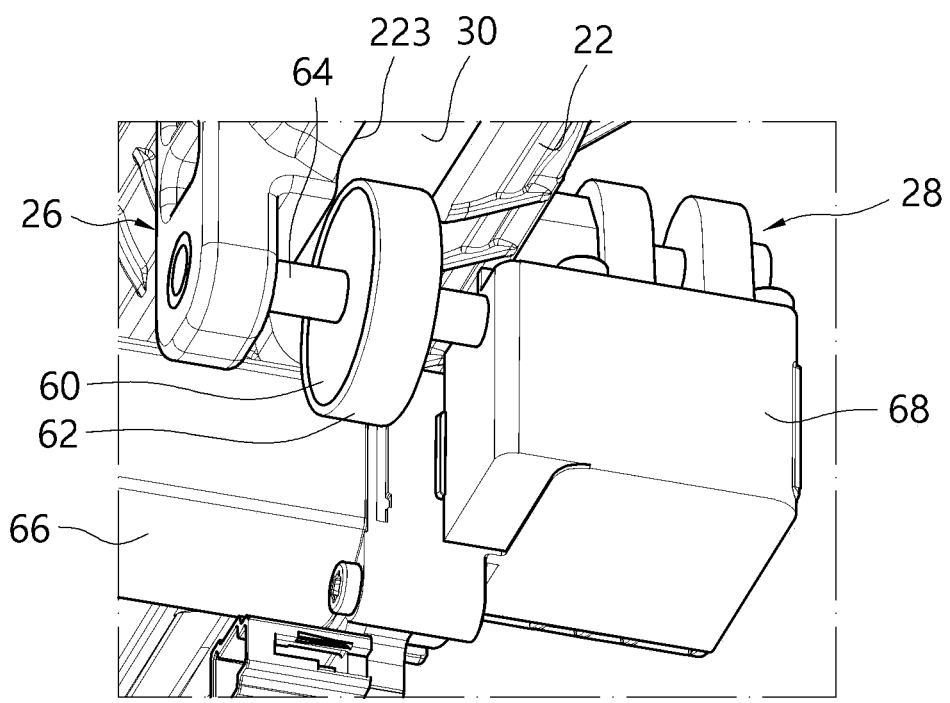
FIG. 5 is an enlarged view of part 'A' in FIG. 2.

Referring to FIGS. 2 and 5, the roller 60, the actuator 66, and a transmission 68 are provided at one side of the housing main body 22, i.e., at a lower side based on FIG. 2. A roller rotation shaft member 64 is provided at a center of the roller 60.

In the present embodiment, the roller rotation shaft member 64 may be disposed in parallel with a second axis C2 and rotate about the second axis C2. One end of the roller rotation shaft member 64 is rotatably coupled to the housing main body 22 by means of the roller coupling part 26.

The transmission 68 is provided. The transmission 68 is installed at one side of the housing main body 22 by means of the transmission coupling part 28. The other end of the roller rotation shaft member 64 is coupled to one side of the transmission 68. The actuator rotation shaft member 67, which may be rotated by the actuator 66, is coupled to the other side of the transmission 68. In this case, the actuator 66 may be configured as an electric motor.

Driving power generated by the actuator 66 may be transmitted to the roller 60 through the actuator rotation shaft member 67, the transmission 68, and the roller rotation shaft member 64. In this case, the transmission 68 appropriately converts a rotational speed and a rotation angle of the actuator rotation shaft member 67 and transmits the driving power to the roller rotation shaft member 64. Therefore, the steering column 1 for a vehicle according to the first embodiment of the present invention may more precisely adjust a rotational speed and a rotation angle of the roller 60.

Referring to FIGS. 2 and 5, in the present embodiment, a roller hole 223 is provided in a lower portion of the housing main body 22 and formed in the direction of the first axis C1. The roller 60 may press an outer peripheral portion of the hollow shaft 30 through the roller hole 223.

In this case, the first axis C1 and the second axis C2 are disposed to be perpendicular to each other. Therefore, when the roller 60 rotates about the second axis C2, a frictional force generated between an outer peripheral surface of the roller 60 and the outer peripheral portion of the hollow shaft 30 may be applied in parallel with the direction of the first axis C1, such that the hollow shaft 30 and the first shaft 40 may be moved in the direction of the first axis C1.

As described above, according to the steering column 1 for a vehicle according to the first embodiment of the present invention, the telescopic means for moving the first shaft 40 and the hollow shaft 30 is simply and compactly implemented by using the roller 60, the actuator 66, and the transmission 68. Therefore, it is possible to reduce a load applied to the housing 20 and the vehicle and improve the spatial utilization of the driver seat.

In addition, the steering column 1 for a vehicle according to the first embodiment of the present invention does not include a separate screw shaft for performing a telescopic function. Therefore, there occurs no structural defect such as bending and warping of the screw shaft.

Meanwhile, in the present embodiment, a friction member 62 having a high frictional coefficient is provided on the outer peripheral surface of the roller 60 in order to increase the frictional force between the roller 60 and the hollow shaft 30. For example, the friction member 62 may be a tire having a tread formed on an outer peripheral portion thereof.

Hereinafter, a process in which the steering column 1 for a vehicle according to the first embodiment of the present invention performs the telescopic function will be more specifically described.

Figure 6:
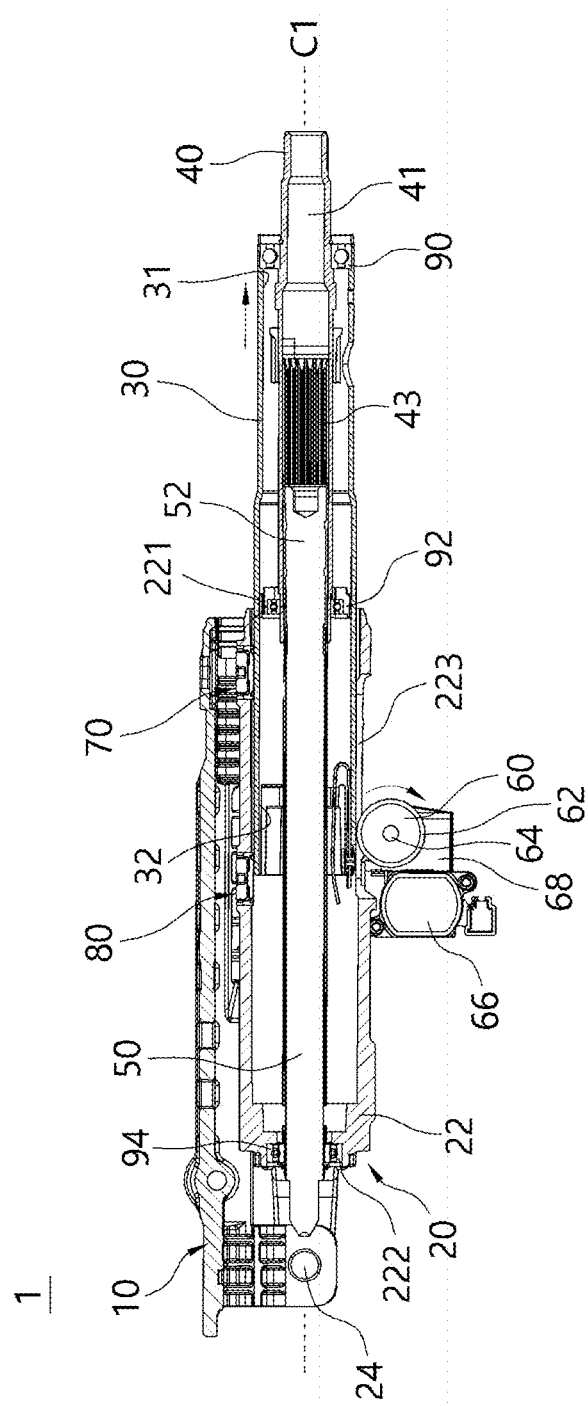
Figure 7:
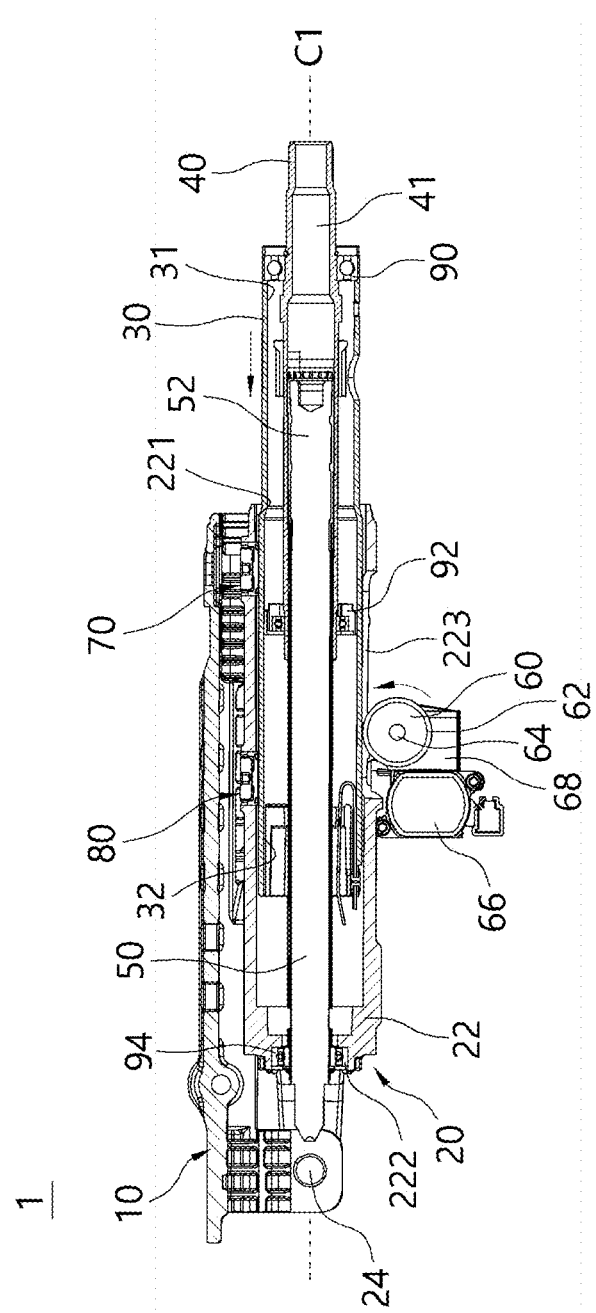

FIGS. 6 and 7 are views for explaining an operating process of the steering column for a vehicle illustrated in FIG. 1, in which FIG. 6 is a view illustrating a state in which the steering shaft protrudes to the outside of the housing as the roller rotates, and FIG. 7 is a view illustrating a state in which the steering shaft is inserted into the housing as the roller rotates.

Referring to FIG. 6, the roller 60 according to the first embodiment of the present invention may rotate clockwise based on FIG. 6 while pressing the outer peripheral surface of the hollow shaft 30. The frictional force generated between the roller 60 and the hollow shaft 30 may move the hollow shaft 30 in the direction of the first axis C1. Therefore, the first shaft may move together with the hollow shaft 30 in the direction of the first axis C1 and protrude to the outside of the housing main body 22 through the first opening 221.

In this case, because the second shaft 50 cannot move in the direction of the first axis C1 relative to the housing main body 22, the second shaft 50 is extended to the outside of the first shaft 40 and the hollow shaft 30 as the first shaft 40 and the hollow shaft 30 move in the direction of the first axis C1.

Referring to FIG. 7, the roller 60 according to the first embodiment of the present invention may rotate counter-clockwise based on FIG. 7 while pressing the outer peripheral surface of the hollow shaft 30. The frictional force generated between the roller 60 and the hollow shaft 30 may move the hollow shaft 30 in a direction opposite to the direction of the first axis C1. Therefore, the first shaft 40 may move together with the hollow shaft 30 in the direction opposite to the direction of the first axis C1 and be inserted into the housing main body 22 through the first opening 221.

In this case, because the second shaft 50 cannot move in the direction of the first axis C1 relative to the housing 20, the second shaft 50 is retracted into the first shaft 40 and the hollow shaft 30 as the first shaft 40 and the hollow shaft 30 move in the direction opposite to the direction of the first axis C1.

As described above, the steering column 1 for a vehicle according to the first embodiment of the present invention adjusts the telescopic distance by using the rotation of the roller 60, such that there is no limitation in the telescopic operating distance. That is, the telescopic operating distance does not depend on the length of the screw shaft.

Figure 8:
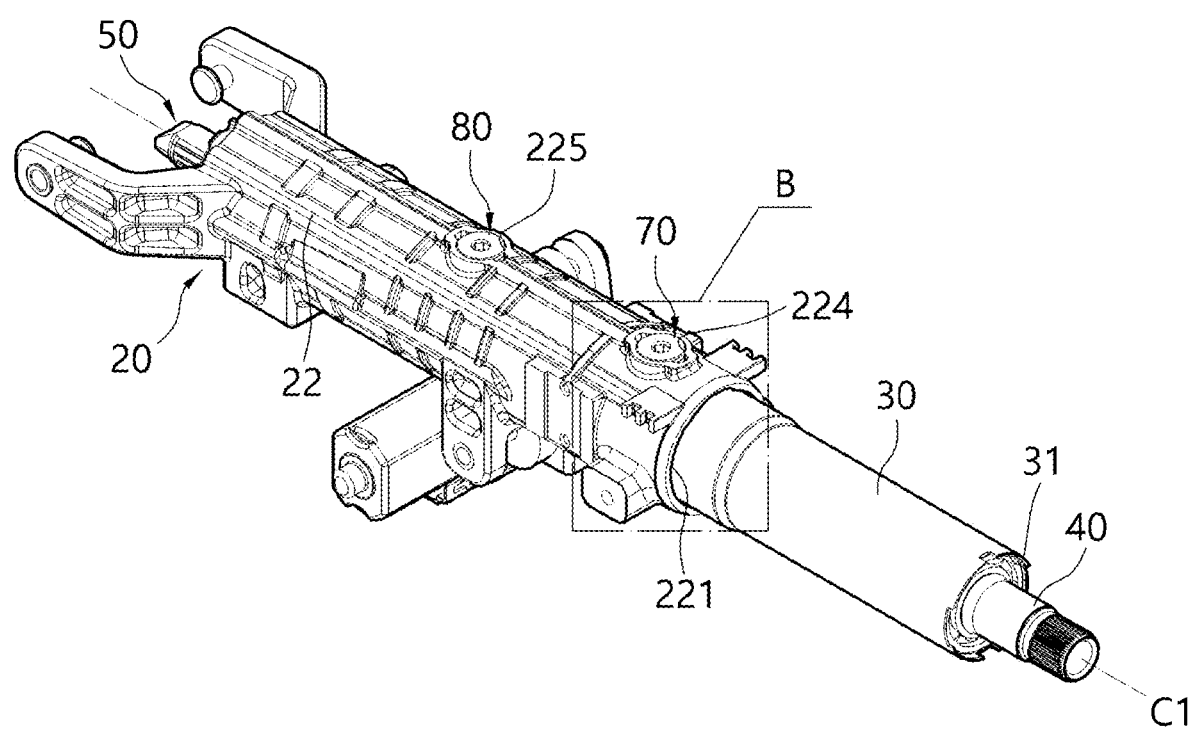
FIG. 8 is a perspective view of the steering column for a vehicle illustrated in FIG. 1. In this case, a base frame is not illustrated for explaining the present invention.
Figure 9:
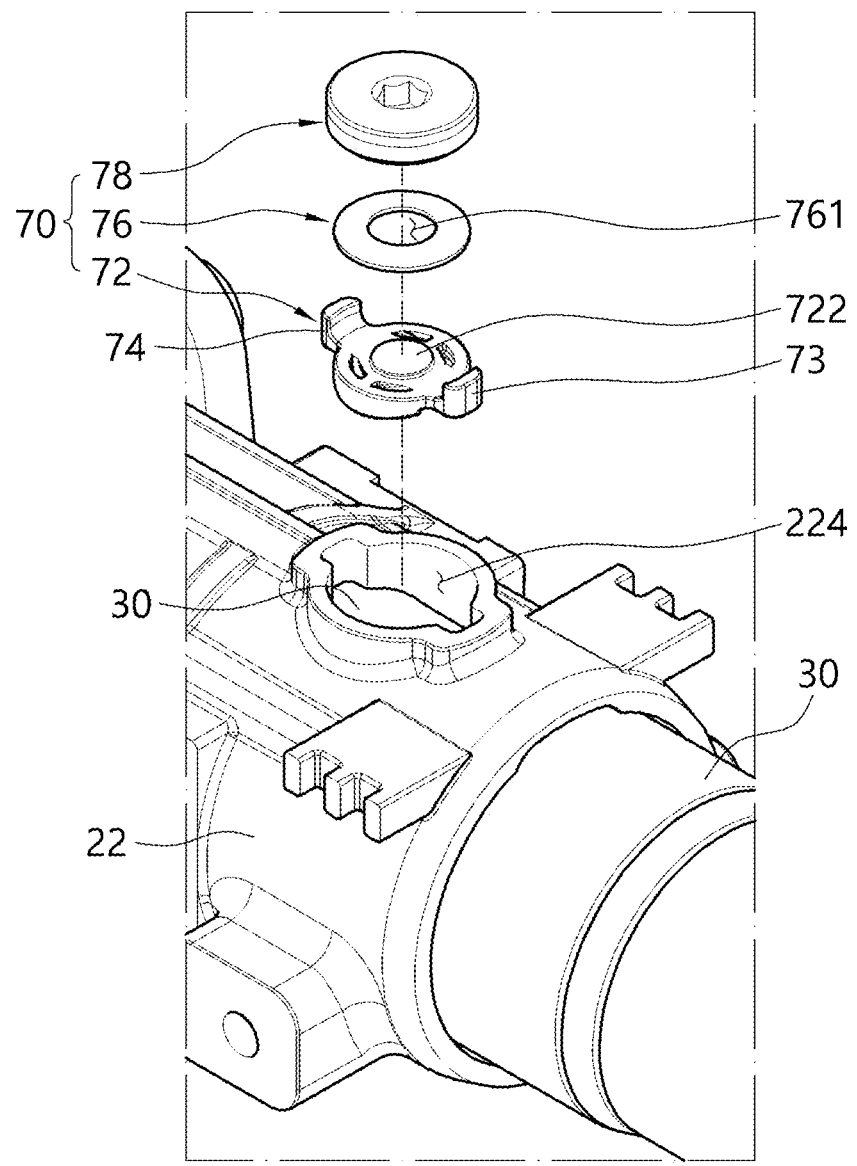
FIG. 9 is an enlarged view of part 'B' in FIG. 8. The housing, a support member, an elastic member, and a coupling member are disassembled for explaining the present invention.
Figure 10:
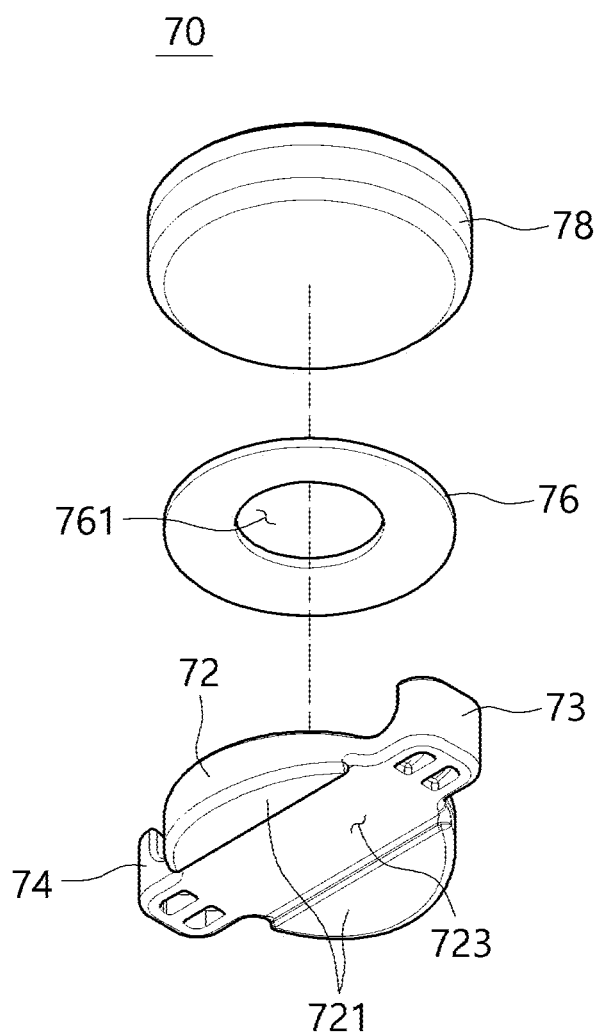
FIG. 10 is an exploded perspective view illustrating the support member, the elastic member, and the coupling member of the steering column for a vehicle illustrated in FIG. 1 when viewed at different angles.
Figure 11:
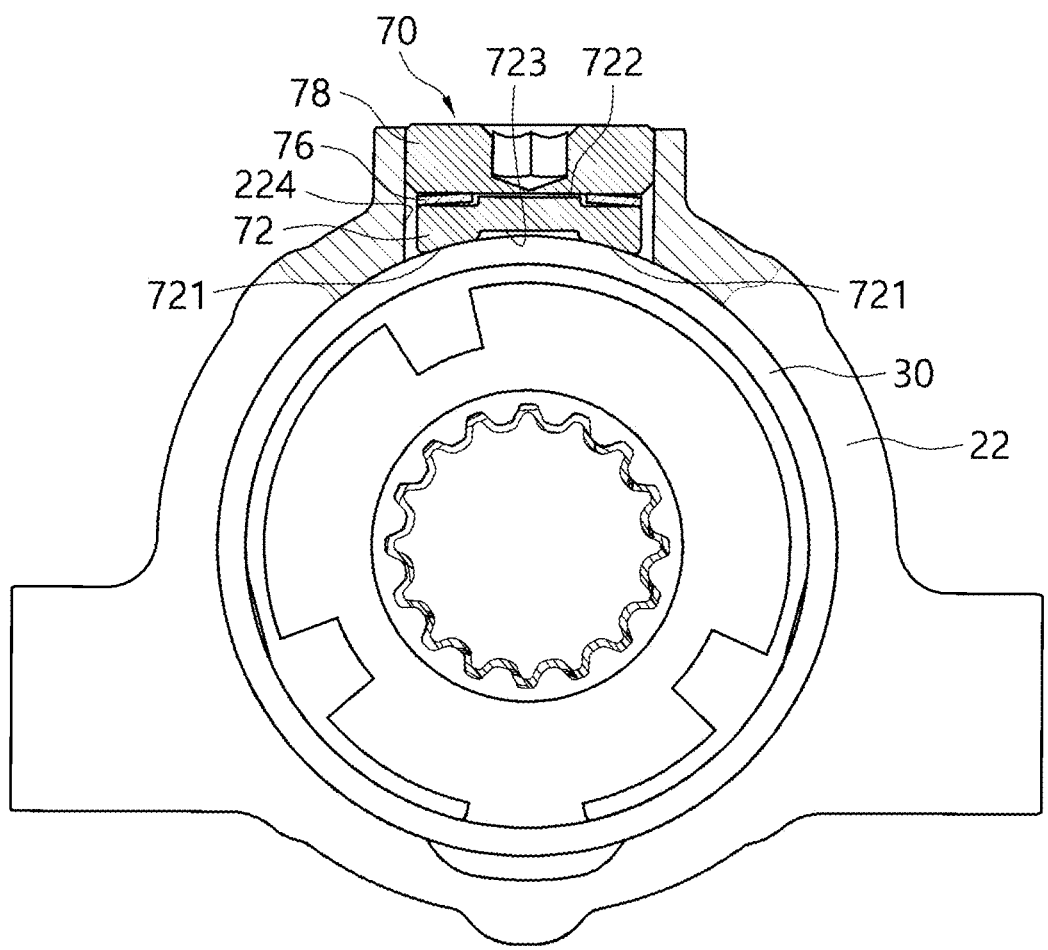
FIG. 11 is a cross-sectional view illustrating a hollow tube, the housing, the support member, the elastic member, the coupling member, and the base frame of the steering column for a vehicle illustrated in FIG. 1.

FIG. 8 is a perspective view of the steering column for a vehicle illustrated in FIG. 1. In this case, the base frame is not illustrated for explaining the present invention. FIG. 9 is an enlarged view of part 'B' in FIG. 8. The housing, a support member, an elastic member, and a coupling member are disassembled for explaining the present invention. FIG. 10 is an exploded perspective view illustrating the support member, the elastic member, and the coupling member of the steering column for a vehicle illustrated in FIG. 1 when viewed at different angles. FIG. 11 is a cross-sectional view illustrating a hollow tube, the housing, the support member, the elastic member, the coupling member, and the base frame of the steering column for a vehicle illustrated in FIG. 1.

Referring to FIGS. 4 and 8, the steering column 1 for a vehicle according to the first embodiment of the present invention may further include support members 70 and 80. The support members 70 and 80 are installed on the housing main body 22 so that one side of each of the support members 70 and 80 supports the hollow shaft 30 while adjoining the outer peripheral portion of the hollow shaft 30. In this case, the support members 70 and 80 may be provided in plural, and the plurality of support members 70 and 80 may include a first support member 70 and a second support member 80.

The first and second support members 70 and 80 are disposed to be opposite to the roller 60 based on the hollow shaft 30. That is, based on FIG. 4, the first and second support members 70 and 80 may be disposed above the hollow shaft 30 so as to be opposite to the roller 60 disposed below the hollow shaft 30.

Therefore, the support member may provide a reaction force that presses the hollow shaft 30 downward against the force applied by the roller 60 to press the hollow shaft 30 upward. A vertical drag force and a frictional force may be generated between the hollow shaft 30 and the roller 60.

Referring to FIGS. 4 and 8, in the present embodiment, the first and second support members 70 and 80 are arranged in the axial direction of the hollow shaft 30 (the direction of the first axis C1). In this case, the first and second support members 70 and 80 may be respectively disposed at a front side L2 and a rear side L2 based on a center L1 of the roller 60 when viewed in the direction of the first axis C1.

The first and second support members 70 and 80 are respectively disposed at the front and rear sides of the roller 60 and support the hollow shaft 30, which makes it possible to prevent the hollow shaft 30 from being inclined by a force applied by the roller 60 to press the hollow shaft 30.

Therefore, the first and second support members 70 and 80 may maintain the horizontality of the hollow shaft 30. Therefore, the inner peripheral surface of the housing 20 and the hollow shaft 30 do not collide with each other, which makes it possible to prevent noise, vibration, and damage to the hollow shaft 30 caused by interference.

Referring to FIGS. 9 and 10, the first support member 70 may include a slip bushing 72, a disc spring 76, and a coupling member 78. The slip bushing 72 is configured as a member that adjoins the outer peripheral portion of the hollow shaft 30 and has a circular plate shape.

A coupling protrusion 722 is formed on one surface of the slip bushing 72, i.e., an upper surface of the slip bushing 72 based on FIG. 9. The coupling protrusion 722 has a predetermined thickness in an outward direction of the slip bushing 72 and has a circular cross-section having a smaller diameter than the slip bushing 72.

Contact surfaces 721 are formed on the other surface of the slip bushing 72, i.e., a lower surface of the slip bushing 72 based on FIG. 10 and correspond to the hollow shaft 30 so that the contact surfaces 721 may be in surface contact with the outer peripheral portion of the hollow shaft 30. A center groove 723 is formed at a center of the contact surfaces 721 and disposed in a direction parallel to the axial direction of the hollow shaft 30.

First and second protruding portions 73 and 74 are formed at lateral sides of the slip bushing 72. In this case, the first and second protruding portions 73 and 74 face each other with the slip bushing 72 interposed therebetween and are disposed in the direction in which the center groove 723 is formed.

For example, the first and second protruding portions 73 and 74 may be respectively formed at front and rear sides of the slip bushing 72 based on FIG. 9. The first and second protruding portions 73 and 74 extend to the outside of the slip bushing 72 and then are bent upward.

An elastic member may be provided at one side of the slip bushing 72. In this case, the elastic member may be configured as a disc spring 76. The disc spring 76 is coupled to the slip bushing 72 as the coupling protrusion 722 of the slip bushing 72 is inserted into the center hole 761 of the disc spring 76.

The coupling member 78 is disposed at a side opposite to the slip bushing 72 based on the disc spring 76. The coupling member 78 is provided as a cylindrical member having a predetermined thickness and one surface that adjoins the disc spring 76. A first screw thread (not illustrated) may be formed on an outer peripheral surface of the coupling member 78.

Referring to FIGS. 9 and 11, in the present embodiment, a coupling hole 224 may be formed in the housing main body 22 and coupled to the first support member 70. The slip bushing 72 is inserted into the coupling hole 224 so that the contact surface 721 adjoins the hollow shaft 30, and then the disc spring 76 and the coupling member 78 are sequentially inserted and disposed into the coupling hole 224.

Grooves are formed in lateral portions of the coupling hole 224 so that the first and second protruding portions 73 and 74 of the slip bushing 72 may be inserted into the grooves. Therefore, the arrangement of the slip bushing 72 may be adjusted so that the direction in which the center groove 723 of the slip bushing 72 is formed is parallel to the axial direction of the hollow shaft 30, thereby improving the assembly properties.

A second screw thread (not illustrated) is formed on an inner peripheral surface of the coupling hole 224 and engages with the first screw thread. A depth by which the coupling member 78 is inserted into the coupling hole 224 may be controlled by adjusting a length of a section in which the first and second screw threads engage with each other, such that a magnitude of a force applied by the slip bushing 72 and the disc spring 76 to press the outer peripheral surface of the hollow shaft 30 may be adjusted.

Meanwhile, the second support member 80 may be identical to the first support member 70, and the second support member 80 may be installed on the housing 20 by means of the same coupling structure as the first support member 70. Therefore, a description thereof will be omitted.

Meanwhile, referring back to FIGS. 2 and 3, the housing 20 is rotatably coupled to the base frame 10 by means of housing rotation shaft members 24. First coupling portions 12 are provided at the other side of the base frame 10 and protrude toward the housing 20 while surrounding lateral portions of the housing 20. In this case, the first coupling portions 12 are symmetrically formed with respect to the housing 20.

Second coupling portions 23 are formed at one side of the housing main body 22. The second coupling portions 23 extend while defining a predetermined angle with respect to the first axis C1 and then extend in parallel with an extension direction of the housing main body 22 (the direction of the first axis C1). In this case, the second coupling portions 23 are symmetrically provided with respect to the first axis C1.

The housing rotation shaft members 24 are installed by simultaneously penetrating the first and second coupling portions 12 and 23. In this case, the housing rotation shaft members 24 are arranged in parallel with a third axis C3 provided to the first axis C1. Therefore, the housing 20 and the first shaft 40 installed on the housing 20 may pivotally rotate about the third axis C3 relative to the base frame 10.

In addition, the housing rotation shaft members 24 each have a length corresponding to a thickness of each of the first and second coupling portions 12 and 23 in the direction of the third axis C3. In this case, the housing rotation shaft members 24 are symmetrically provided with respect to the housing 20. Therefore, there occurs no interference between the housing rotation shaft members 24 and the second shaft 50 even though the second shaft 50 protrudes to the outside of the housing 20 through the second opening 222 of the housing main body 22.

Meanwhile, a tilting device (not illustrated) capable of pivotally rotating the housing 20 about the third axis C3 may be provided at one side of the housing 20. The tilting device may be installed in the base frame 10 or the vehicle.

In this case, the tilting device may be configured as a publicly-known motor and a transmission device that provide power for rotating the housing 20 and the first shaft 40 installed in the housing 20. Therefore, the steering column 1 for a vehicle according to the first embodiment of the present invention may perform the tilting function of adjusting an angle by which the steering wheel provided at one end of the first shaft 40 is inclined.

Hereinafter, second and third embodiments of the present invention will be described. The steering columns for a vehicle according to the second and third embodiments of the present invention may have the same components as the steering column according to the first embodiment, except for rollers, gears, and hollow shafts. Therefore, a description of the same components will be omitted, and the rollers, the gears, and the hollow shafts according to the second and third embodiment of the present invention will be described.

Figure 12:
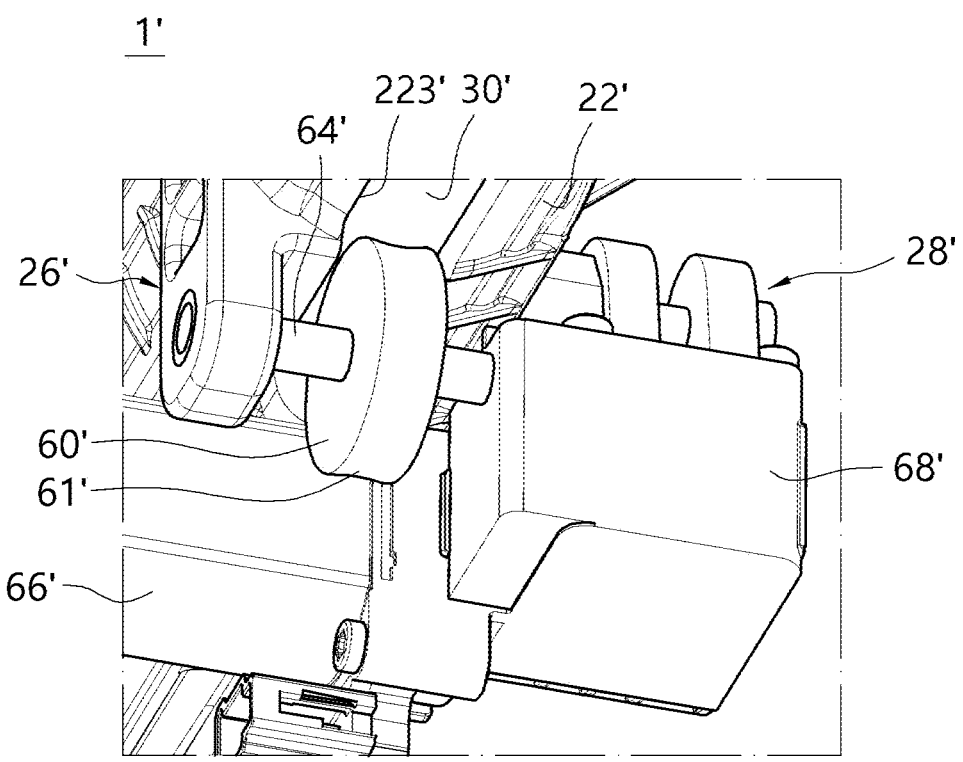
FIG. 12 is an enlarged perspective view illustrating a part of a steering column for a vehicle according to a second embodiment of the present invention.
Figure 13:
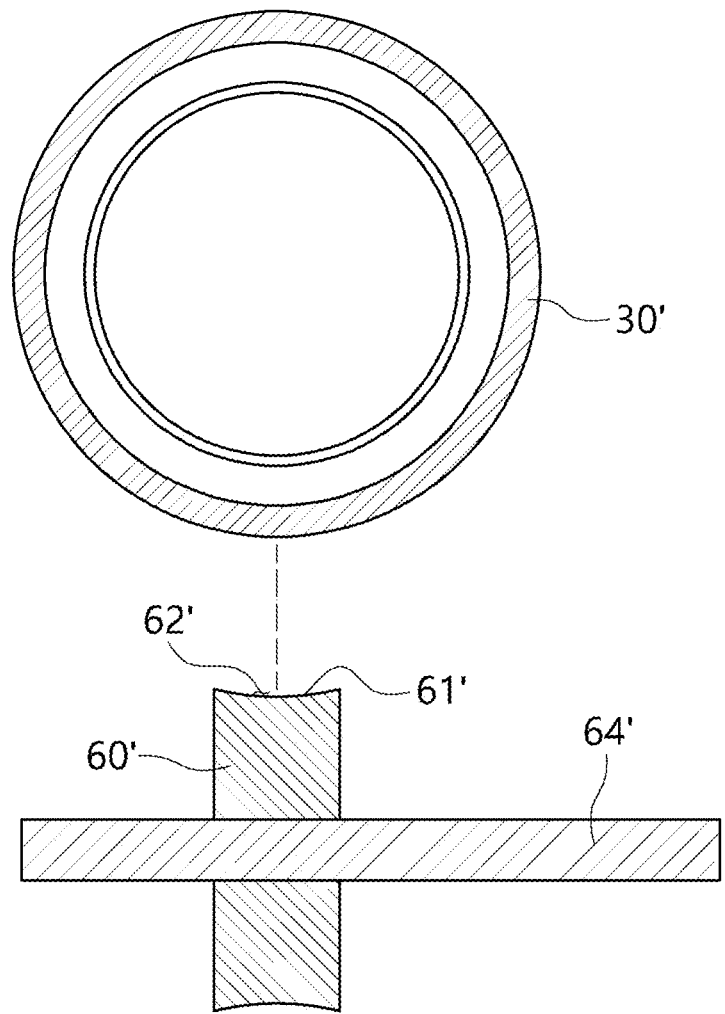
FIG. 13 is a cross-sectional view illustrating a roller and a hollow shaft of a steering column for a vehicle illustrated in FIG. 12. The roller and the hollow shaft are somewhat spaced apart from each other for explaining the present invention.

FIG. 12 is an enlarged perspective view illustrating a part of a steering column for a vehicle according to a second embodiment of the present invention. FIG. 13 is a cross-sectional view illustrating a roller and a hollow shaft of a steering column for a vehicle illustrated in FIG. 12. The roller and the hollow shaft are somewhat spaced apart from each other for explaining the present invention.

Referring to FIGS. 12 and 13, a groove 62' is provided in an outer peripheral surface of a roller 60' of a steering column 1' for a vehicle according to a second embodiment of the present invention and formed in a circumferential direction of the roller 60'. In this case, the groove 62' of the roller 60' has a shape corresponding to a shape of an outer peripheral portion of a hollow shaft 30'.

The outer peripheral portion of the hollow shaft 30' adjoins and is seated on an inner surface 61' of the groove 62' formed in the roller 60'. Therefore, an area in which the outer peripheral surface of the roller 60' and the outer peripheral portion of the hollow shaft 30' adjoin each other may increase.

Therefore, the roller 60' of the steering column 1' for a vehicle according to the second embodiment of the present invention may more stably press the outer peripheral portion of the hollow shaft 30', and driving power generated by an actuator 66' may be efficiently converted into a frictional force that may move the hollow shaft 30' in the axial direction.

Meanwhile, a friction member (not illustrated) having a high frictional coefficient may be provided inside the groove 62' of the roller 60' according to the second embodiment of the present invention. The friction member may increase a frictional force between the roller 60' and the hollow shaft 30'.

Figure 14:
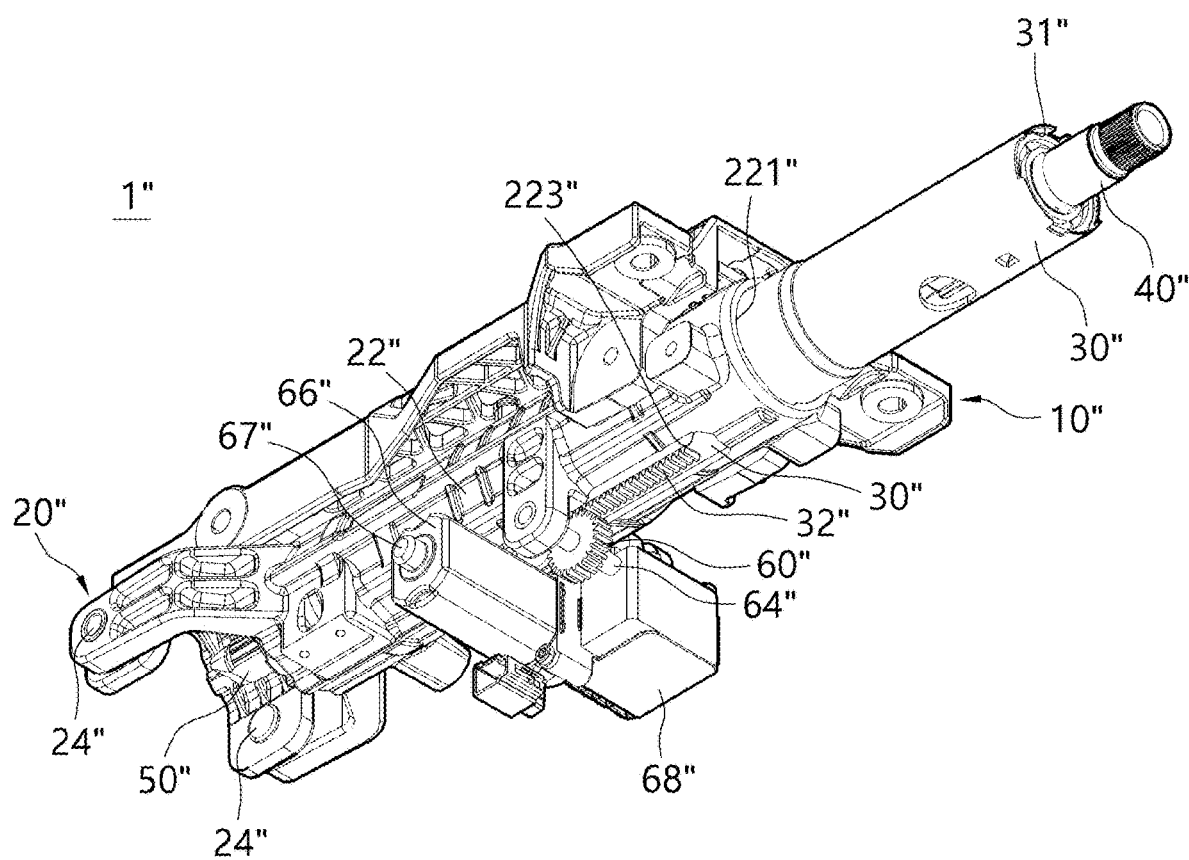
FIG. 14 is a perspective view of a steering column for a vehicle according to a third embodiment of the present invention.
Figure 15:
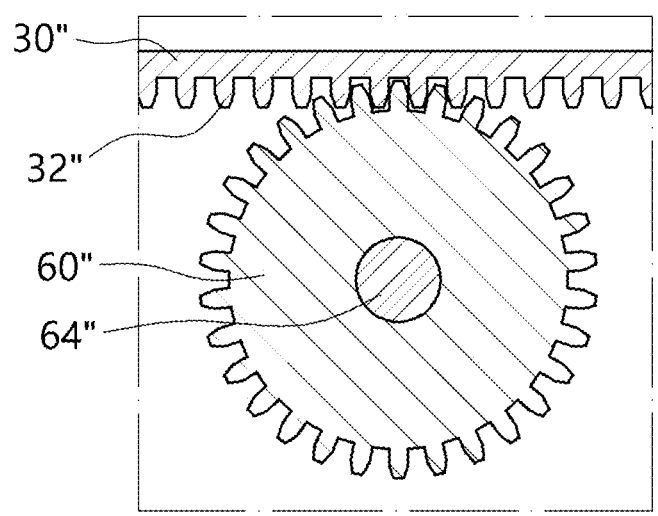
FIG. 15 is a cross-sectional view illustrating a hollow shaft and first and second gears of the steering column for a vehicle illustrated in FIG. 14.

FIG. 14 is a perspective view of a steering column for a vehicle according to a third embodiment of the present invention. FIG. 15 is a cross-sectional view illustrating a hollow shaft and first and second gears of the steering column for a vehicle illustrated in FIG. 14.

Referring to FIGS. 14 and 15, a steering column 1" for a vehicle according to a third embodiment of the present invention may include a first gear 32" and a second gear 60". In this case, the first and second gears 32" and 60" may each be configured as a publicly-known gear member. For example, the first gear 32" may be a rack gear, and the second gear 60" may be a spur gear.

The first gear 32" is provided on an outer peripheral portion of a hollow shaft 30" and formed in an axial direction of the hollow shaft 30". Of course, the first gear 32" may be formed in a direction different from the axial direction of the hollow shaft 30" so that the hollow shaft 30" may move in the direction different from the axial direction.

In this case, in the present embodiment, the first gear 32" is provided at one side portion of the hollow shaft 30", i.e., a lower portion of the hollow shaft 30" based on FIG. 14. A gear hole 223" is formed in a housing 20", provided in the axial direction of the hollow shaft 30", and disposed at a position corresponding to the first gear 32".

The second gear 60" is disposed at one side of the hollow shaft 30" and one side of the housing 20". In this case, the second gear 60" may be coupled to the first gear 32" of the hollow shaft 30" through the gear hole 223" of the housing 20". A gear shaft 64" is formed at a center of the second gear 60". The gear shaft 64" is disposed in a direction perpendicular to the hollow shaft 30".

The transmission 68" is provided. The transmission 68" may be installed at one side of the housing 20". The gear shaft 64" may be coupled to one side of the transmission 68", and an actuator 66" may be coupled to the other side of the transmission 68".

The actuator 66" may generate driving power and rotate the second gear 60" through the transmission 68" and the gear shaft 64". When the second gear 60" is rotated in one direction by the actuator 66", the first gear 32" engaging with the second gear 60" may receive a force in the axial direction of the hollow shaft 30" or a direction opposite to the axial direction.

That is, the second gear 60" may transmit the driving power, which is generated by the actuator 66", to the hollow shaft 30" through the first gear 32". Therefore, the first gear 32", the hollow shaft 30", and a first shaft 40" may move to the inside or outside of the housing 20" through a first opening 221".

As described above, according to the steering column for a vehicle according to the embodiment of the present invention, the first shaft to which the steering wheel is coupled is movable in the axial direction together with the hollow shaft, such that the telescopic function of adjusting a degree to which the steering wheel protrudes may be performed.

In addition, according to the steering column for a vehicle according to the embodiment of the present invention, the roller or gear configured to rotate about the axis performs the telescopic function by moving the hollow shaft and the first shaft in the axial direction. Therefore, it is possible to perform the telescopic function without limitation in operating distance.

In addition, according to the steering column for a vehicle according to the embodiment of the present invention, the telescopic function is performed by the simple and compact configuration using the rotation of the roller or gear, and the screw shaft in the related art is not required. Therefore, it is possible to reduce the number of required components and the manufacturing costs, minimize the likelihood of the occurrence of a structural defect such as bending of the shaft, and improve the spatial utilization of the driver seat.

While the embodiments of the present invention have been described above, the spirit of the present invention is not limited to the embodiments presented in the present specification, those skilled in the art, who understand the spirit of the present invention, may easily propose other embodiments by adding, changing, deleting constituent elements within the same spirit and scope of the present invention, and it can be said that the embodiments are also within the spirit and scope of the present invention.

DESCRIPTION OF REFERENCE NUMERALS

1: Steering column for a vehicle
10: Base frame
20: Housing
30: Hollow shaft
40: First shaft
50: Second shaft
60: Roller
70: First support member
80: Second support member
90, 92, 94: Bearing

What is claimed is:

1. A steering column for a vehicle, the steering column comprising:
    a housing provided in a vehicle and having an opening formed at one side thereof;
    a hollow shaft installed in the housing and configured to be movable in an axial direction through the opening of the housing;
    a roller having an outer peripheral surface configured to press an outer peripheral portion of the hollow shaft;
    an actuator configured to provide driving power for rotating the roller; and
    a first shaft configured to rotate relative to the hollow shaft and installed in the hollow shaft so as to be movable together with the hollow shaft,
    wherein when the roller rotates, the hollow shaft and the first shaft are moved by a frictional force generated between the hollow shaft and the roller.

2. The steering column of claim 1, further comprising:
    a support member configured to press an outer peripheral surface of the hollow shaft to support the hollow shaft.

3. The steering column of claim 2, wherein the support member is disposed opposite to the roller based on the hollow shaft.

4. The steering column of claim 3, wherein the support member is provided in plural.

5. The steering column of claim 4, wherein the plurality of support members comprise first and second support members arranged in the axial direction.

6. The steering column of claim 5, wherein the first and second support members are respectively disposed at front and rear sides based on the roller when viewed in the axial direction.

7. The steering column of claim 2, wherein the support member comprises:
a slip bushing configured to support the hollow shaft; and
an elastic member configured to provide an elastic force that allows the slip bushing to support the hollow shaft.

8. The steering column of claim 1, wherein a through-hole is formed in the axial direction in the housing, at least a part of the hollow shaft is accommodated in the housing, and the roller presses the hollow shaft through the through-hole.

9. The steering column of claim 1, wherein a rotation shaft of the roller and the first shaft are disposed to be perpendicular to each other.

10. The steering column of claim 1, wherein a friction member is provided on the outer peripheral surface of the roller.

11. The steering column of claim 1, wherein a groove is formed in the outer peripheral surface of the roller and corresponds to an outer peripheral surface of the hollow shaft.

12. The steering column of claim 1, further comprising:
a transmission configured to connect the actuator and the roller.

13. The steering column of claim 1, wherein a bearing is provided between the first shaft and the hollow shaft.

14. The steering column of claim 1, further comprising:
a second shaft coupled to one end of the first shaft by a spline structure.

15. A steering column for a vehicle, the steering column comprising:
a housing provided in a vehicle and having an opening formed at one side thereof;
a hollow shaft installed in the housing, configured to be movable in an axial direction through the opening of the housing, and having a first gear formed in the axial direction on an outer peripheral surface thereof;
a second gear coupled to the first gear;
an actuator configured to provide driving power for rotating the second gear; and
a first shaft configured to rotate relative to the hollow shaft and installed in the hollow shaft so as to be movable together with the hollow shaft,
wherein when the second gear rotates, the hollow shaft and the first shaft are moved by the first gear coupled to the second gear.

16. A steering column for a vehicle, the steering column comprising:
a housing provided in a vehicle and having an opening formed at one side thereof;
a hollow shaft installed in the housing, configured to be movable in an axial direction through the opening of the housing, and having a pressing part formed in the axial direction at one side thereof;
a roller having an outer peripheral surface configured to press the pressing part of the hollow shaft;
an actuator configured to provide driving power for rotating the roller; and
a first shaft configured to rotate relative to the hollow shaft and installed in the hollow shaft so as to be movable together with the hollow shaft,
wherein when the roller rotates, the hollow shaft and the first shaft are moved by a frictional force generated between the roller and the pressing part of the hollow shaft.

* * * * *